United States Patent [19]

Ikeda et al.

[11] E Re. 31,601

[45] Reissued Jun. 12, 1984

[54] COMPOSITE FABRIC COMBINING ENTANGLED FABRIC OF MICROFIBERS AND KNITTED OR WOVEN FABRIC AND PROCESS FOR PRODUCING SAME

[75] Inventors: Masataka Ikeda; Tatsuo Ishikawa; Tsukasa Shima, all of Nobeoka, Japan

[73] Assignee: Asahi Kasei Kogyo Kabushiki Kaisha, Osaka, Japan

[21] Appl. No.: 245,777

[22] Filed: Mar. 20, 1981

Related U.S. Patent Documents

Reissue of:

[64] Patent No.: 4,146,663
Issued: Mar. 27, 1979
Appl. No.: 826,007
Filed: Aug. 19, 1977

[30] Foreign Application Priority Data

| | | | |
|---|---|---|---|
| Aug. 23, 1976 | [JP] | Japan | 51-99726 |
| Nov. 11, 1976 | [JP] | Japan | 51-134708 |
| Nov. 26, 1976 | [JP] | Japan | 51-141095 |

[51] Int. Cl.[3] ..... D06N 3/00

[52] U.S. Cl. ..... 428/93; 28/104; 428/96; 428/233; 428/239; 428/246; 428/252; 428/253; 428/284; 428/287; 428/298; 428/299; 428/302; 428/303; 428/903; 428/904

[58] Field of Search ..... 428/85, 220, 219, 224, 428/96, 238, 239, 246, 252, 253, 284, 287, 233, 298, 299, 302, 303, 903, 904, 287, 290, 423.1, 93; 28/104

[56] References Cited

U.S. PATENT DOCUMENTS

| | | | |
|---|---|---|---|
| 2,543,101 | 2/1951 | Francis | 428/239 |
| 2,943,010 | 6/1960 | Stefl et al. | 428/239 |
| 3,068,547 | 12/1962 | L'Hommedieu | 428/239 |
| 3,149,019 | 9/1964 | Skotnicki et al. | 428/236 |
| 3,214,819 | 11/1965 | Guerin | 28/104 |
| 3,769,659 | 11/1973 | Kalwaites | 28/104 |
| 3,873,255 | 3/1975 | Kalwaites | 28/104 |
| 4,147,574 | 4/1979 | Setsue et al. | 428/235 |

*Primary Examiner*—James J. Bell
*Attorney, Agent, or Firm*—Sprung, Horn, Kramer & Woods

[57] ABSTRACT

The disclosed composite fabric, useful as a substratum for artificial leather, comprises a woven or knitted frabic and at least one non-woven fabric firmly bonded to the woven or knitted fabric, and is produced by providing a precursory sheet with two or more layers from a woven or knitted fabric and one or more fibrous webs which consist of numerous extremely fine fibers having an average diameter of from 0.1 to 6.0 microns, and uniformly impacting the fibrous web surface of the precursory sheet with numerous fluid jets ejected under a high pressure of from 15 to 100 kg/cm$^2$, at a ratio of a total impact area of the fluid jets on the precursory sheet surface to an area of the precursory sheet surface to be impacted of at least 1.5, in order to allow the extremely fine fibers in the fibrous web to randomly entangle with each other and also to allow a portion of the extremely fine fibers to penetrate into the inside of the woven or knitted fabric and entangle with a portion of the fibers in the woven or knitted fabric.

31 Claims, 11 Drawing Figures

Fig. 1 (NATURAL LEATHER)
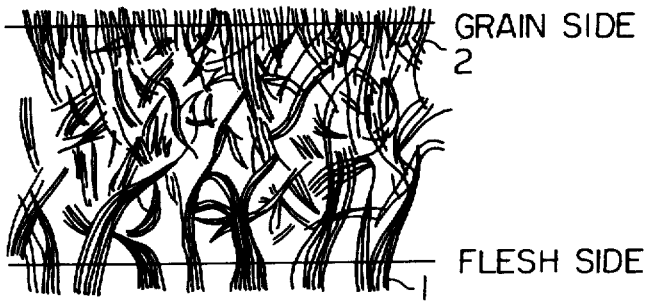
Fig. 2 (PRIOR ART)
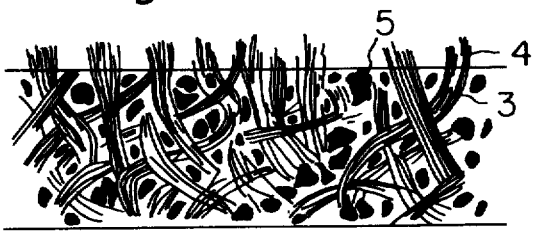
Fig. 3
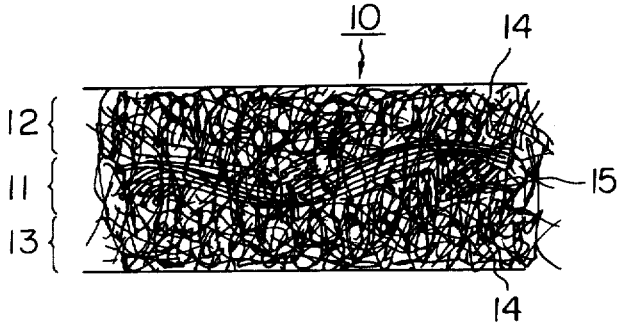

COMPOSITE FABRIC COMBINING ENTANGLED FABRIC OF MICROFIBERS AND KNITTED OR WOVEN FABRIC AND PROCESS FOR PRODUCING SAME

Matter enclosed in heavy brackets [ ] appears in the original patent but forms no part of this reissue specification; matter printed in italics indicates the additions made by reissue.

The present invention relates to a composite fabric and a process for producing the same. More particularly the present invention relates to a composite fabric usable as a substratum sheet for artificial leather and comprises at least one non-woven fabric constituent and a woven or knitted fabric constituent firmly bonded to form a body of a composite fabric, and a process for producing the composite fabric.

It is known that natural leather is composed of numerous collagen fiber bundles. When the back side surface of the natural leather is buffed to provide a pile surface layer, the resultant product is a suede leather. Also, when the grain side surface is buffed, the resultant product is a so-called nubuck leather. The buffed surface of the nubuck leather consists of very thin collagen fiber piles.

Generally, artificial leather is produced by impregnating a substratum sheet consisting of a non-woven fabric with an elastic polymer material, for example, polyurethane and butadiene-styrene rubber. If desired, the artificial leather is buffed to convert it into a suede or nubuck-like artificial leather. Accordingly, in order to prepare an artificial leather having a nubuck-like buffed surface, it is important that numerous piles consisting of extremely fine individual fibers are formed at a high density on the surface of the artificial leather, the surface of the artificial leather has a writing effect like that of the natural nubuck leather, and the artificial leather has a high softness and a proper draping property. The artificial leather is also required to have a high resistance to breakage even if the artificial leather has a small thickness of 1 mm or less.

Accordingly, there have been various atempts made to obtain an artificial leather satisfying the above-mentioned requirements. For example, Japanese Patent Application Publication No. 49-48583(1974) (corresponding to U.S. Pat. No. 3,932,687) discloses a non-woven fabric composed of fibrous bundles of fine fibers having a denier of 1.5 or less. The non-woven fabric is prepared from special composite fibers, that is, inland-in-sea type composite fibers. In the preparation of an artificial leather from this non-woven fabric, the non-woven fabric is impregnated with an elastic polymer and, then, the fibrous bundles located on the surface portion of the non-woven fabric are raised to form numerous piles. However, this type of the non-woven fabric has a relatively low density because the sea components are removed from the composite fibers in order to convert the composite fibers into the fiber bundles. Therefore, the density of the piles formed on the artificial leather is also relatively low. In the case where the piles are relatively short, portions of the raised surface of the artificial leather are occupied with the elastic polymeric material and, therefore, the resultant artificial leather exhibits a rough appearance and a gritty feel. Furthermore, this type of artificial leather, having a small thickness of 1 mm or less, has poor tensile and tear strengths due to the fact that the substratum is composed of a non-woven fabric in which the fiber bundles are randomly entangled. Especially, the thin artificial leather has a very poor resistance to breakage at the seams thereof, in which seams portions of the artificial leather are strongly and frequently flexed while the artificial leather is being worn or processed.

Further, in the process for producing the above-mentioned conventional type of artificial leather, the island-s-in-sea type composite filaments are crimped by using a crimping machine, and cut to form a desired length of staple fibers. Then, the staple fibers are formed into a random web by using a random webber and the random web is needle punched to convert it into a precursory non-woven fabric. Thereafter, the sea component is removed from the precursory non-woven fabric so as to convert it into a final non-woven fabric composed of the island component fiber bundles. The above-mentioned process for producing the final non-woven fabric involves an undesirable chemical treatment for removing the sea component and is very complicated and expensive.

Japanese Patent Application Publications No. 41-3759(1966) and No. 51-6261(1976) disclose a non-woven fabric usable as a substratum of the artificial leather. This type of non-woven fabric is composed of fibrous bundles of extreamly fine fibers or porous fibers having a honeycomb-like cross-sectional profile. This non-woven fabric is produced by providing composite fibers from a blend of at least two types of component polymers and removing at least one component polymer from the composite fibers after forming a precursory non-woven fabric from the composite fibers. This process also involves the undesirable chemical treatment for removing the component polymer and is very complicated and expensive.

Japanese Patent Application Publication No. 41-21475(1966) discloses a non-woven fabric usable as a substratum for suede-like artificial leather. The non-woven fabric is prepared by providing a random web from a mixture of staple fibers having a denier of 0.5 (a cross-sectional diameter of about 7 microns) and crimped staple fibers having a denier of 1.5, and needle-punching the random web to convert it into a non-woven fabric. However, this type of non-woven fabric can not be provided with uniform piles in a high density and, therefore, can not have a good writing property that is, chalk mark-forming property. Therefore, the raised artificial leather produced by using the above-mentioned non-woven fabric as a substratum, is quite different in appearance from natural nubuck leather and has a poor density, tensile and tear strengths and dimentional stability because the substratum is composed of only the non-woven fabric having a poor density, tensile and tear strengths and dimensional stability.

Japanese Patent Application Laying-open No. 50-121570(1975) discloses a process for producing a composite fabric. In this process discontinuous extremely fine fibers are produced in a melt-blow method and are directly blown toward a woven or knitted fabric by action of fluid jets. In the initial stage of the blowing step, a portion of the blown fibers can penetrate into the inside of the woven or knitted fabric. However, after the surface of the woven or knitted fabric is covered by a stratum of the extremely fine fibers, the extremely fine fibers can not penetrate into the inside of the woven or knitted fabric and, therefore, the combination of the woven or knitted fabric with the stratum of the extremely fine fibers can not be proceeded any more. Particularly, when the stratum of the extremely fine fibers becomes a weight of 20 g/m$^2$ or more, the blown extremely fine fibers are completely unable to penetrate into the woven or knitted fabric through the stratum of the extremely fine fibers. Therefore, the stratum of the extremely fine fibers is bonded to the woven or knitted fabric with a very poor bonding strength of 10 g/cm or less. Further, in the stratum of the extremely fine fibers produced in accordance with this type of process, the extremely fine fibers are distributed only in two dimentions, and can not be randomly distributed in three dimensions and entangled with each other with a high degree of entanglement.

That is, this type of process can not convert the stratum of the extremely fine fibers into a non-woven fabric. Accordingly, the resultant composite fabric has a poor bulkiness and recovery from compression. When this composite fabric is utilized as a substrate, the resultant artificial leather has an undesirable paper-like appearance and feel, and can not provide piles formed in a high density on the surface thereof. Also, the surface of the artificial leather has a very poor resistance to abrasion. Therefore, this type of composite fabric is can not be utilized for producing nubuck-like artificial leather. Additionally, when the fibers produced by the melt-blow method adhere to each other, the resultant composite fabric has an undesirable relatively high stiffness.

An object of the present invention is to provide a composite fabric capable of providing a pile layer consisting of extremely fine fibers existing at a high density and useful as a substratum sheet for a nubuck-like artificial leather having a desirable chalk mark-forming property.

Another object of the present invention is to provide a composite fabric usable as a substratum sheet for artificial leather having a proper softness and being useful as a material for clothing, and a process for producing the same.

Still another object of the present invention is to provide a composite fabric usable as a substratum sheet for artificial leather having high resistances to breakage and abrasion, a high dimensional stability, and a process for producing the same.

The above-mentioned objects can be attained by the composite fabric of the present invention which comprises a woven or knitted fabric constituent and at least one non-woven fabric constituent, in an amount of 100% or more based on the weight of said woven or knitted fabric constituent, and consisting of numerous extremely fine individual fibers which have an average diameter of 0.1 to 6.0 microns and are randomly distributed and entangled with each other to form a body of non-woven fabric, said non-woven fabric constituent and said woven or knitted fabric constituent being superimposed and bonded together, to form a body of composite fabric, in such a manner that a portion of said extremely fine individual fibers in said non-woven fabric constituent penetrate into the inside of said woven or knitted fabric constituent and are entangled with a portion of fibers in said woven or knitted fabric constituent, and the bonding strength between said woven or knitted fabric constituent and said non-woven fabric constituent is at least 30 g/cm.

The above-mentioned composite fabric can be produced by using the process of the present invention which comprises:

forming a fibrous web constituent by randomly massing numerous extremely fine individual fabrics having an average cross-sectional diameter of from 0.1 to 6.0 microns;

forming a multilayer precursory sheet by superimposing a woven or knitted fabric constituent and at least one said fibrous web constituent on each other;

jetting numerous fluid streams ejected under a pressure of from 15 to 100 kg/cm$^2$ toward the surface of said fibrous web constituent of said precursory sheet at a ratio of a total impact area of said fluid jets on the precursory sheet surface to an area of the precursory sheet surface to be impacted of at least 1.5, to convert said fibrous web into a non-woven fabric constituent in which said extremely fine individual fibers are randomly entangled with each other and to convert said precursory sheet into a composite fabric in which said non-woven fabric constituent is bonded to said woven or knitted fabric constituent in such a manner that a portion of said extremely fine individual fibers penetrate from said non-woven fabric constituent into the inside of said woven or knitted fabric constituent and are entangled with a portion of the fibers within said woven or knitted fabric constituent. The above-mentioned conversions of the fibrous web into the non-woven fabric constituent and of the precursory sheet into the composite fabric is promoted by applying a reduced pressure of 10 to 200 mmHg onto a surface of said precursory sheet opposite to the fibrous web surface.

Further features and advantage of the present invention will be apparent from the following description, with reference to the accompanying drawings, wherein:

FIG. 1 is a cross-sectional model view of an internal structure of natural leather;

FIG. 2 is an explanatory view of a cross-sectional profile of a conventional artificial leather using fibrous bundles of extremely fine fibers;

FIG. 3 is an explanatory view of a cross-sectional profile of a three constituent composite fabric of the present invention;

Referring to FIG. 1, which shows the internal structure of natural leather, numerous collagen fiber bundles, which vary in thickness, are entangled with each other.

That is, the collagen fiber bundles located in the back side surface portion of natural leather have a relatively large thickness and are composed of relatively thick individual collagen fibers. However, the grain side surface portion of natural leather is composed of numerous very thin collagen fiber bundles and very thin individual collagen fibers.

Accordingly, in a suede leather, which is prepared by buffing the back side surface of the leather, the buffed surface is covered with numerous piles consisting of the relatively thick collagen fiber bundles spaced from each other. Compared with suede leather, in a nubuck leather, which is produced by buffing the grain side surface of the leather, the piles covering the buffed surface consist of very thin collagen fiber bundles and very thin collagen individual fibers standing close to each other. Consequently, in order to obtain an artificial leather having a nubuck-like buffed surface, it is important that the piles consisting of very thin fiber bundles and very fine individual fibers be formed in a high density.

Referring to FIG. 2, showing an internal structure of a conventional artificial leather, numerous fiber bundles, having a relatively large thickness, are randomly entangled, and the piles 4 formed on the buffed surface thereof are spaced from each other. That is, the piles are formed at a relatively low density. Accordingly, a portion of an elastic polymer 5 impregnated between the fiber bundles 3 is sometimes not completely covered with the piles. This results in an artificial leather of low quality.

Figure 4:
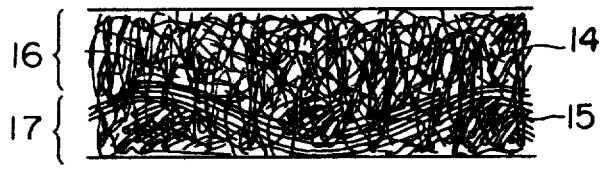
FIG. 4 is an explanatory view of a cross-sectional profile of a two constituent composite fabric of the present invention.

The composite fabric of the present invention has a cross-sectional structure as explanatorily shown in FIG. 3 or 4. Referring to FIG. 3, the composite fabric 10 is composed of a woven or knitted fabric constituent 11 embedded between an upper non-woven fabric constituent 12 and a lower non-woven fabric constituent 13. In each non-woven fabric constituent, numerous extremely fine fibers 14 are randomly entangled with each other in three dimensions. Further, portions of the extremely fine fibers penetrate from the non-woven fabric constituents 12 and 13 into the inside of the knitted or woven fabric constituent 11, and entangle with a portion of the fibers 15 in the woven or knitted fabric constituent 11. Accordingly, the non-woven fabric constituents 12 and 13 are firmly bonded to the woven or knitted fabric constituent 11 to form a body of composite fabric.

Referring to FIG. 4, a non-woven fabric constituent 16 is superimposed on and firmly bonded to a woven or knitted fabric constituent 17 in the same manner as mentioned above.

Figure 5:
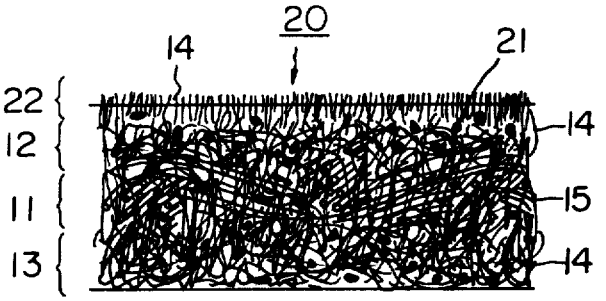
FIG. 5 is an explanatory view of a cross-sectional profile of an artificial leather produced by using a composite fabric of the present invention and having a pile layer.

Referring to FIG. 5, an artificial leather 20 is composed of a composite fabric, as a substratum, impregnated with an elastic polymer 21. The composite fabric has the same internal structure as that indicated in FIG. 3, except that the surface layer of the upper non-woven fabric constituent 12 is buffed so as to form a pile layer 22. The pile layer 22 consists of numerous extremely fine fibers 14 uniformly distributed in a high density. That is, the extremely fine fibers 14 are independent from each other but not be formed into fiber bundles.

The extremely fine fibers usable for the composite fabric of the present invention have an average diameter of 0.1 to 6.0 microns, which corresponds to a denier in a range of about 0.0001 to about 0.35. A diameter smaller than 0.1 microns will result in a very poor tensile strength of the resultant extremely fine fiber. Also, a diameter greater than 6 microns will cause the resultant composite fabric to have a poor softness and the resultant artificial leather to have a poor chalk mark-forming property due to a low density of the fibers located in the pile layer.

The artificial leather having a nubuck-like appearance, feel and chalk mark-forming property can be obtained by utilizing the composite fabric of the present invention, in which the non-woven fabric constituent is composed of extremely fine fibers with a diameter of 0.1 to 6.0 microns, preferably, 0.5 to 3.0 microns, more preferably, 1.0 to 2.0 microns.

The extremely fine fibers usable for the present invention are not limited to a specified group of polymers as long as the polymers are capable of forming the extremely fine fibers having the specified diameter. For example, the extremely fine fibers may consist of a regenerated cellulose, for instance, viscose rayon, and cuprammonium rayon, or a synthetic polymer, for instance, polyester, polyamide, polyolefin polyacrylonitrile, a copolymer of two or more of the monomers for forming the above-mentioned polymers or a mixture of two or more of the above-mentioned polymers. The polyamides involve nylon 6, nylon 66, nylon 10, nylon 11, nylon 12, a copolymer of nylon 6 with nylon 66, a copolymer of nylon 6 with nylon 10, a copolymer of nylon 6 with isophthalamide, a copolymer of nylon 6 with polyoxyethylene-di-amine, a copolymer of nylon 66 with polyoxyethylene-di-amine, a blend polymer of nylon 66 and polyethyleneglycol, a blend of nylon 6 and polyethyleneglycol, a blend of nylon 6 or nylon 66 and at least one of the copolymers described above, and an aromatic polyamide such a polymethaphenylene tetraphthalamide and poly-N-methyl-phenylene tetraphthalamide.

The polyesters may be polyethylene terephthalate, a polyethylene terephthalate-isophthalate copolymer, a polyethylene terephthalate-adipate copolymer, a polyethylene terephthalate-trimediate copolymer, a polyethylene terephthalate-sebacate copolymer, a polyethylene terephthalate-succinate copolymer, a polyethylene-diethylene glycol terephthalate copolymer, a polyethylene-ethylene glycol terephthalate copolymer or a mixture of two or more of the above-mentioned polymers.

The polyacrylic polymers may be polyacrylonitrile, a copolymer of acrylonitrile with at least one member selected from methyl acrylate, methyl methacrylate and ethyl acrylate, or a mixture of two or more of the above-mentioned polymers.

The polyolefins may be polyethylene, polypropylene or a mixture of polyethylene and polypropylene.

The extremely fine fibers can be produced by using any of the conventional fiber-producing methods. Preferably, the extremely fine fibers are produced from a thermoplastic synthetic polymer by using a melt-blow method. In order to produce a nubuck-like artificial leather, it is more preferable that the extremely fine fibers are produced from polyethylene terephthalate by using the melt-blow method. This is because the polyethylene terephthalate fibers have a proper shrinkage which is effective for forming the pile layer having a high density.

In the composite fabric, it is desired that the extremely fine fibers in the non-woven fabric constituent are three dimensionally entangled with each other at a proper degree of entanglement. That is, the extremely fine fibers should be entangled with each other to such an extent that the resultant non-woven fabric constituent has a density of 0.10 to 0.30 g/cm$^3$, more preferably, 0.15 to 0.28 g/cm$^3$, and a tensile strength of 0.10 to 0.30 kg/mm$^2$, more preferably, 0.12 to 0.26 kg/mm$^2$. Further, it is desired that the bonding of at least one non-woven fabric constituent with the woven or knitted fabric constituent will result in a composite fabric having an average density of 0.15 to 0.32 g/cm$^3$, more preferably 0.18 to 0.30 g/cm$^3$, and a tensile strength of 0.5 to 1.8 kg/mm$^2$, more preferably, 0.7 to 1.5 kg/mm$^2$.

When a composite fabric is impregnated with an elastic polymer and buffed on a surface thereof, a non-woven fabric constituent having a density lower than 0.10 g/cm$^3$ and a tensile strength lower than 0.10 kg/mm$^2$ will cause the resultant artificial leather to have a paper-like appearance and feel, and a pile layer having a poor density. Also, the utilization of a non-woven fabric constituent having a density greater than 0.30 g/cm$^3$ and a tensile strength higher than 0.30 kg/mm$^2$ will result in an artificial leather which is poor in natural leather-like softness, draping property and resilience.

In the composite fabric of the present invention, it is required that at least one non-woven fabric constituent be in a total amount of at least 100%, preferably, at least 150%, more preferably, 200 to 800%, based on the weight of the woven or knitted fabric constituent. The total amount of less than 100% of the non-woven fabric constituent will result in an extremely poor resilience, compressibility and recovery from compression and a very low bulkiness of the resultant composite fabric. Further, the excessively small amount of the non-woven fabric constituent will cause the resultant composite fabric to exhibit the disadvantage that the non-woven fabric constituent can not completely cover the woven or knitted fabric constituent and, therefore, a portion of the woven or knitted fabric constituent appears on the surface of the non-woven fabric constituent layer. Such appearance of the composite fabric can not be utilized as a substratum for the artificial leather.

In order to produce an artificial leather useful as a material for clothing, the composite fabric is required to have a high softness and resiliency. In order to meet this requirement, it is preferably that the non-woven fabric constituent has a total weight of 50 to 200 g/m$^2$, more preferably, 80 to 250 g/m$^2$, still more preferably, 100 to 200 g/m$^2$.

The extremely fine fibers in the non-woven fabric constituent are required not only to randomly and three-dimensionally entangle with each other with a high degree of entanglement, but a portion of the extremely fine fibers are required to penetrate into the inside of the woven or knitted fabric constituent and entangle with a portion of the fibers in the woven or knitted fabric constituent to such an extent that both of the constituents are firmly bonded to each other with a bonding strength of 30 g/cm or more.

The higher the degree of entanglement of the extremely fine fibers, penetrated from the non-woven fabric constituent, with the fibers in the woven or knitted fabric constituent, the higher the bonding strength between both the constituents. A bonding strength of 30 g/cm or more is sufficient to unite the non-woven fabric constituent and the woven or knitted fabric constituent into a body of composite fabric having a proper density. In the case where the bonding strength is lower than 30 g/cm, the resultant composite fabric tends to be easily divided into the separate constituents while the composite fabric is processed, and also tends to form a paper-like artificial leather having a poor resiliency in spite of impregnation of the composite fabric with an elastic polymer.

In order to provide an artificial leather useful as a material for clothing, the composite fabric to be used as a substratum is required to have not only a high tensile strength, resiliency and bulkiness, but also a high softness. In order to satisfy these requirements, it is preferable that the bonding strength between the non-woven fabric constituent and the woven or knitted fabric constituent be in a range of from 50 to 250 g/cm, more preferably, 70 to 200 g/cm. The bonding strength is determined in accordance with a method which will be explained in detail hereinafter.

The woven or knitted fabric usable as a constituent of the composite fabric of the present invention is required to have a density of weaving or knitting structure which allow the fabric to have spaces formed between the fibers or yarns, which spaces are large enough to receive the portion of the extremely fine fibers penetrated from the non-woven fabric constituent into inside of the woven or knitted fabric constituent. That is, it is preferable that the woven or knitted fabric has a weight of 10 to 100 g/m$^2$, more preferably, 20 to 80 g/m$^2$, still more preferably, 30 to 60 g/m$^2$. A very thin woven or knitted fabric having a weight smaller than 10 g/m$^2$ and a low density is sometimes difficult to uniformly open without the formation of wrinkles. The resultant composite fabric from the thin woven or knitted fabric has poor tensile and tear strengths. Also, a very thick woven or knitted fabric with a weight of 100 g/m$^2$and a high density is sometimes difficult to firmly bond to the non-woven fabric due to the difficulty in the penetration of the extremely fine fibers from the non-woven fabric into woven or knitted fabric.

The fibers in the woven or knitted fabric constituent may consist of the same as or different from that of the extremely fine fibers. That is the woven or knitted fabric constituent may be composed of viscose rayon fibers, cuprammonium rayon fibers, cellulose acetate fibers, polyamide fibers, polyester fibers, polyacrylic fibers, polyolefin fibers or the like. The woven or knitted fabric constituent may be composed of a mixture of two or more of the above-mentioned types of fibers, for example, a mixture of the viscose of cuprammonium rayon fibers and the polyamide fibers or a mixture of the polyester fibers and the polyamide fibers. The fibers in the woven or knitted fabric constituent preferably have a denier of 5 or less, more preferably, 0.2 to 3. If the denier of the fibers is excessively large, the resultant composite fabric will create a high stiffness in the artificial leather prepared from the composite fabric. Further, it is preferable that the yarns from which the woven or knitted fabric is formed have a total denier of 150 or less, more preferably, 100 or less, still more preferably, 70 or less.

The woven or knitted fabrics usable for the composite fabrics of the present invention are not restricted to a specific class of fabrics, and can include various types of knitted fabrics, for example, plain stitch fabrics, warp knitted fabrics, warp knitted fancy fabrics, weft knitted fabrics, for instance, tricot fabrics, weft knitted fancy fabrics and laces, as well as various types of woven fabrics, for example, plain weave fabrics, twill fabrics, stain fabrics and figured cloths.

In the preparation of the composite fabric of the present invention, a fibrous web consisting of extremely fine fibers is arranged on a surface of a woven or knitted fabric constituent and, if necessary, another fibrous web consisting of the extremely fine fibers is arranged on the opposite surface of the woven or knitted fabric to provide a precursory sheet. The precursory sheet is, then, subjected to a treatment with high speed fluid stream jets to convert the precursory sheet into a body of composite fabric.

The fibrous web can be prepared from the extremely fine fibers by using any of the conventional methods. However, it is preferable that the fibrous web be produced by using a melt-blow method or a paper-making method. The melt-blow method may be the one disclosed in Japanese Patent Application Laying-open No. 50-46972(1975). In this method, a melted thermoplastic fiber-forming polymer is extruded through numerous spinning orifices arranged in a row into a high speed stream of a gas. The resultant discontinuous extremely fine fibers are blown onto a screen conveyer, continuously forwarded in one direction below the spinning orifices, and accumulated on the screen conveyer to form a fibrous web. In the preparation of the fibrous web in the melt-blow method, it is important to uniformly distribute the resultant fibers on the screen while preventing melt-adhering of the resultant individual fibers to each other. That is, it is important, in order to easily convert the fibrous web into a non-woven fabric, that the individual fibers be independent from each other and free in movement in relation to each other. For the above-mentioned purpose, it is desirable that the distance between the screen and the orifices be in a range of 20 to 60 cm, more preferably, 30 to 55 cm. The fibrous web produced by the melt-blow method, is composed of extremely fine independent fibers which do not form fibrous bundles. In the web, the fibers are laid down along the surface of the web and entangled with each other in a low degree of entanglement. However, the fibers can not substantially extend in a direction at a right angle to the web surface and, also, can not entangle with each other in this direction. The degree of entanglement of the fibers can be expressed in terms of the tensile strength and density of the fibrous web. Usually, the fibrous web produced in the melt-blow method, has a tensile strength of about 0.01 $kg/mm^2$ and a density of from 0.02 to 0.05 $g/cm^3$. Even if the fibrous web is compressed to increase the density of the web to about 0.2 $g/cm^3$, the resultant compressed web still has a poor tensile strength of about 0.05 $kg/mm^2$. This phenomenon illustrates the fact that, in the fibrous web produced by using the melt-blow method, the fibers are entangled with each other at a very low degree of entanglement.

When the fibrous web, having a low degree of entanglement of the fibers therein, is impregnated with an elastic polymer, and the resultant artificial leather is buffed, the buffed artificial leather has a paper-like appearance and feel, and a low resiliency, and is provided with a pile layer having a very low density and a poor resistance to abrasion. Therefore, the fibrous web mentioned above is not suitable for producing a nubuck-like artificial leather. The extemely fine fibers produced by using the melt-blow method have a diameter of 0.1 to 6.0 microns. The fine fibers may have a length of about 3 cm or more.

The fibrous web prepared by the method as mentioned above is superimposed on the surface of a woven or knitted fabric and, if necessary, another fibrous web is superimposed on the opposite surface of the woven or knitted fabric. Otherwise the fibrous web can be formed on a surface of a woven or knitted fabric being continuously conveyed on the conveyer screen by using the melt-blow method. In this case, it is necessary to prevent the melt-adhering of the fibers to each other by spacing the woven or knitted fabric surface from the orifices a distance of 20 to 60 cm.

In order to three-dimentionally entangle the extremely fine fibers in the web with each other with a high degree of entanglement and to firmly bond the non-woven fabric constituent to the woven or knitted fabric constituent, the precursory sheet is subjected to a treatment thereof with numerous fluid stream jets having a high speed. By utilizing this type of treatment, both the constituents can be firmly bonded togehter substantially without breakage or deterioration of the extremely fine fibers in the non-woven fabric constituent and the fibers in the woven or knitted fabric constituent, and a composite fabric having a high bonding strength and bulkiness can be obtained.

The conventional needle-punching method in unsuitable for producing the composite fabric of the present invention, because the needle-punching operation results in breakage of the extremely fine fibers and can not cause the entanglement of the extremely fine fibers with each other. Also, when the fibrous web consisting of the extremely fine fibers is needle-punched with numerous needles each having a barb, a number of the extremely fine fibers are removed by action of the barb with the result that numerous holes are undesirably formed in the web. Furthermore, the needle-punching operation causes a portion of the fibers in the woven or knitted fabric to be broken or to penetrate to the outersurface of the fibrous web through the body of the fibrous web. The needle-punched composite fabric has a low mechanical strength, for example, tensile strength, tear strength and sewing strength. Accordingly, even if this needle-punched composite fabric is impregnated with the elastic polymer and, then, the surface of the impregnated composite fabric is buffed, the resultant artificial leather has a paper-like appearance and feel, and a low uniformity is quality due to its poor resiliency, and bonding strength, and a poor density of the pile layer. Therefore, the needle-punched composite fabric can not be used as the substratum for a nubuck-like artificial leather.

The treatment of the precursory sheet with the high speed fluid stream jets can be carried out by using a method as disclosed in the Japanese Patent Application No. 48-13749(1973).

Figure 6:
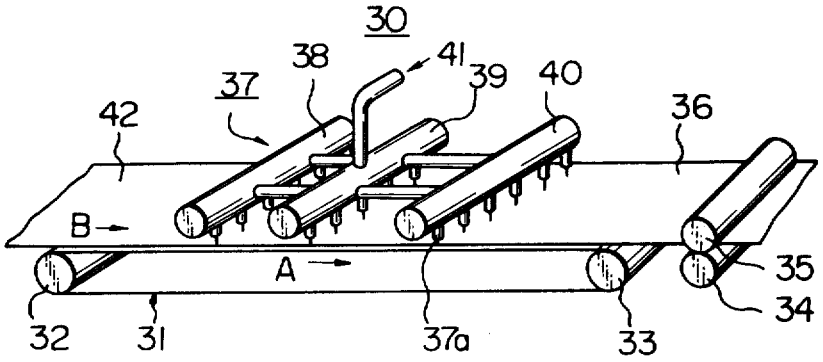
FIG. 6 is a schematic view of an apparatus for ejecting numerous high velocity fluid streams toward a precursory sheet.

Referring to FIG. 6, an apparatus 30 for ejecting numerous fluid stream jets comprises a screen conveyer 31 which rotates around a pair of rollers 32 and 33, a pair of rollers 34 and 35 for delivery a resultant composite fabric 36, and a nozzle device 37 for ejecting the fluid stream jets. The nozzle device 37 has numerous orifices 37a through which a fluid is ejected under a high pressure to form numerous the fluid stream jets. The ejecting orifices are arranged in at least one row. In the apparatus as indicated in FIG. 6, the ejecting orifices are arranged in three rows and formed on three distributing pipes 38, 39 and 40. These distributing pipes 38, 39 and 40 are connected to a fluid supply source (which is not shown in FIG. 6) through a main pipe 41.

In the operation of the apparatus as shown in FIG. 6, the screen conveyer 31 is rotated in a direction of an arrow A, and a precursory sheet 42 is placed on the screen 31 in such a manner that the fibrous web surface of the precursory sheet faces the orifices 37 and is forwarded on the screen conveyer 31 in the direction shown by an arrow B. Numerous fluid stream jets are ejected through the orifices 37 toward the fibrous web surface of the precursory sheet 42 to convert it into a composite fabric 36. The ejecting device 37 is reciprocally moved in a direction at a right angle to the direction in which the precursory sheet 42 is forwarded so as to uniformly impact the precursory sheet with a number of the fluid jets ejected under a high pressure. The precursory sheet 42 is converted into a body of the composite fabric 36 and, then, the resultant composite fabric is delivered by the delivery rollers 34 and 35.

In the process for converting the precursory sheet into the composite fabric, it is preferable that at the same time as the fluid stream jetting operation, a reduced pressure of 10 to 200 mmHg is applied onto a surface of the precursory sheet opposite to the fibrous web surface. This pressure reducing operation is effective to suck the fluid through the body of the precursory sheet together with numerous air bubbles formed in the inside of the precursory sheet. The air bubbles existing in the inside of the presursory sheet obstruct the entanglement of the extremely fine fibers with each other and with the fibers in the woven or knitted fabric constituent. However, the air bubbles are very difficult to remove with suction due to the extremely small size of the air bubbles which are formed in extremely small spaces formed between the extremely fine fibers.

The reduced pressure to be applied onto the opposite surface of the precursory sheet is required to be in a range of from 10 to 200 mmHg, more preferably, 20 to 100 mmHg. An excessively reduced pressure larger than 200 mmHg tends to restrict the freedom of movement of the extremely fine fibers in the precursory sheet, and therefore, to obstruct the entanglement of the extremely fine fibers with each other and with the fibers in the woven or knitted fabric constituent.

In the fluid stream ejecting operation, it is preferable that the fluid jet be formed from water and be in the form of a right circular rod.

Figure 7:
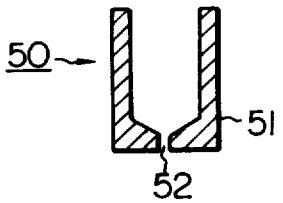
FIG. 7 is a cross-sectional view of an orifice through which the high velocity fluid stream is ejected.

FIG. 7 shows a cross-sectional profile of an orifice usable for the process of the present invention. In the orifice 50 as shown in FIG. 7, a cylindrical orifice 51 has an ejecting hole 52. The diameter of the ejecting hole 52 is preferably in a range of from 0.06 to 0.20 mm, more preferably, 0.07 to 0.15 mm, still more preferably, 0.08 to 0.12 mm. In order to eject water through the ejecting hole, it is preferable that the water be under a pressure of 15 to 100 kg/cm$^2$, more preferably, 20 to 70 kg/cm$^2$. The higher the ejecting pressure of the water, the higher the bonding strength and the density of the resultant composite fabric. However, an excessively high ejecting pressure will result in formation of undesirable holes in and dents on the resultant composite fabric. The excessively high ejecting pressure also will result in an excessively high density and stiffness of the resultant composite fabric. Also, an excessively low ejecting pressure will result in a poor bonding strength of the non-woven fabric constituent and the woven or knitted fabric constituent, and in incomplete conversion of the fibrous web into the non-woven fabric.

In the fluid stream ejecting operation, it is important that the fibrous web surface of the precursory sheet be uniformly impacted with numerous fluid stream jets. For this purpose, it is required that the fluid jetting operation be carried out at a total impact area ratio of at least 1.5, the term "total impact area ratio" referring to a ratio of a total impact area of fluid jets on a precursory sheet surface to an area of the precursory sheet surface to be impacted. For example, in the case where a precursory sheet is forwarded at a constant velocity in one direction, and the location of the fluid stream jets is reciprocally moved in a direction at a right angle to the forwarding direction of the precursory sheet, the total impact area ratio can be calculated in accordance with the formula (I)

$$\text{Total impact area ratio} = 2nNATR/WL \qquad (1)$$

wherein R represent the diameter in cm of an area where the fluid stream impacts with the fibrous web surface, L represents the forwarding velocity in cm/min of the precursory sheet, T represents the number of reciprocal movements per minute of the fluid stream, n represents the number of fluid streams jetted onto the precursory sheet, N represent the number of jetting operations applied to the precursory sheet, A represents the length in cm of one movement of the fluid stream and W represents the width in cm of the precursory sheet.

Only when the fluid jetting operation is carried out at a total impact area ratio of 1.5 or more, can the fibrous web be uniformly and completely converted into a body of a non-woven fabric constituent and is the non-woven fabric constituent able to be uniformly and completely bonded to the woven or knitted fabric constituent. In the case of a total impact area ratio less than 1.5, it is impossible to obtain a composite fabric having a high enough bonding strength for producing a practically useful artificial leather. In view of the necessary degree of density, bonding strength and entanglement of the extremely fine fibers with each other of the composite fiber usable for producing the artificial leather, the fluid jetting operation is preferably performed at a total impact area ratio of 2.0 to 50, more preferably, 3.0 to 10. An extremely large total impact area ratio, for example, more than 50, will results in an excessively high density of the resultant composite fabric. Such an excessively high density will cause the resultant artificial leather to have an excessively high stiffness. Further, it should be noted that an excessively large total impact area ratio, for example, of more than 50, will be unable to contribute to the increase of the bonding strength of the resulting composite fabric.

In the above-described ejecting process, the high speed fluid stream jets may directly impact on the fibrous web surface of the precursory sheet. Otherwise, a metal net may be located between the ejecting orifices and the fibrous web surface so as to weaken the impacting force of the fluid stream jets and divide then into a plurality of thin streams by contact of the fluid stream jets with the net. The reciprocal movement of the fluid stream jets may be carried out along either a straight line or a curve. Otherwise, a rotational movement may be added to the reciprocal movement of the fluid stream jets.

The ejecting operation may be carried out one or more times for one precursory sheet. However, it is preferable that the at least two ejecting operations be applied to one precursory sheet. That is, it is preferable that a first ejecting operation be applied to one precursory sheet so as to strongly impact against it, and, then, a later ejecting operation or operations be applied to the precursory sheet so as to weakly impact against it. The first strong impact operation results in formation of holes and dents on the surface of the fibrous web and, therefore, in formation of a rough surface of the resultant composite fabric. When such a composite fabric is converted into an artificial leather and buffed, the rough surface results in an uneven pile layer. Accordingly, it is preferable to eliminate the holes and dents formed in the first ejecting operation by the later ejecting operation or operations. That is, the later ejecting operation is effective for obtaining a nubuck-like artificial leather having an even pile surface, and a high and uniform density.

For the purpose of the eliminating the holes and dents formed by action of the fluid stream jets in a proceeding jetting step, it is preferable that each fluid stream jet in a preceding jetting step impact against the precursory sheet in an impact area smaller than that in a succeeding step and the impacting force of each fluid stream jets in a preceding jetting step be at least ten times that in a succeeding step. That is, the impact area in a second or later jetting step is preferably in a range of from 3.0 to 5.0 $mm^2$.

The term "impact area", used herein, refers to a cross-sectional area of one fluid stream jet in which the fluid stream jet impacts against the precursory sheet surface. The impact area can be determined by using either of the following methods. In the case where a fluid stream jet is in the form of a cone, the impact area is calculated from the distance between the ejecting orifice and the precursory sheet surface, and an angle between the axis of the cone and the normal line of the cone. In the other method, a photograph of the impact area is taken, and the impact area is measured on the photographic print.

The term "impacting force", used herein, refers to a force applied by one fluid stram jetted onto the precursory sheet surface and can be determined in accordance with the equation (2)

$$F=k(PS/A) \quad (2)$$

wherein F represents an impacting force, P represents a pressure in $kg/cm^2$ under which a fluid is ejected through an orifice, S represents a cross-sectional area in $cm^2$ of an ejecting hole of the orifice, A represents an impact area in $cm^2$ and k is a constant.

In the jetting process, it is preferable that the ratio of the impacting force of each fluid stream jet in a preceding jetting step to that in a succeeding jetting step be at least ten, and more preferably, that the impacting force satisfys the following equation (3)

$$1/500 \leqq F_2/F_1 \leqq 1/10 \quad (3)$$

wherein $F_1$ represents the impacting force of one fluid stream jet in a preceding step and $F_2$ represents the impacting force of one fluid stream jet in a succeeding step.

If the above-mentioned ratio is smaller than 1/500, the holes and dents formed in a preceding jetting step sometimes can not be completely eliminated by a succeeding jetting step. Also, if the above-mentioned ratio is larger than 1/10, the succeeding jetting step sometimes results in formation of holes and dents on the precursory sheet, while the holes and dents formed in the preceding jetting step are eliminated by the succeeding jetting step.

The succeeding jetting step may utilize the same nozzle device as indicated in FIG. 7 or another type of a nozzle device, for example, a spraying device. However, it is necessary that the jetting operation is succeeding step be uniformly applied onto the precursory sheet.

The composite fabric of the present invention can be converted into an artificial leather by using any of the conventional methods. For example, the method disclosed in Japanese Patent Application Publication No. 37-2489(1962) can be utilized for producing an artificial leather from the composite fabric of the present invention. In order to obtain an artificial leather having a high resiliency and softness, it is preferable that the composite fabric be impregnated with 20 to 70%, more preferably, 25 to 45%, of a rubber-like elastic polymer based on the weight of the composite fabric. The elastic polymer may be selected from polyurethane, synthetic rubbers such as butadiene-acrylonitrile rubber and butadiene-styrene rubber, elastic polyvinyl chlorides, elastic acrylic polymers, polyaminoacids, and elastic copolymers of two or more monomers of the above-mentioned polymers.

Also, it is preferable that after the composite fabric is impregnated with the rubber-like elastic polymer, the impregnated composite fabric be shrunk at an area shrinkage of 5 to 20%, more preferably, 7 to 15%. The area shrinking process is effective for increasing the density and resiliency of the resultant artificial leather and the density of the pile layer. Therefore, even in the case where the piles are sheared to form a very thin pile layer, the surface of the resultant artificial leather can be uniformly covered by a dense pile layer consisting of extremely fine fibers and no rubber-like elastic polymer appears on the surface of the artificial leather. A good quality of a nubuck-like artificial leather can be obtained from the composite fabric of the present invention.

The artificial leather produced from the composite fabric of the present invention may be raised by using any conventional raising machine, for example, a card clothing raising machine and a so-called sander. In the card clothing raising machine, a card clothing in which numerous fine needles stand at a high density on a thin rubber sheet, is wound on a rotatable drum. In the raising operation, the drum is rotated at a high speed in such a manner than the top ends of the needles are brought into contact with the surface of the artificial leather to be raised so as to convert the individual fine fibers located in the surface portion of the artificial leather into piles.

The sander involves a drum sander in which sand paper is wound on a rotatable drum of a belt sander in which an endless belt consisting of a sand paper is rotated. In both types of sanders, the sand paper is brought into contact with the surface of the artificial leather to raise the surface.

The card clothing raising machine is suitable to form relatively long piles and the sander is proper to produce relatively short piles. Accordingly, the raising machine suitable for obtaining a nubuck-like artificial leather is the sander rather than the card clothing raising machine. However, the artificial leather may be raised by concurrently using the sander and the card clothing raising machine. Further, the raised artificial leather may be subjected to a brushing or shearing process to improve the quality of the raised pile surface of the artificial leather.

The surface of the artificial leather may also be coated with a thin layer of a polyurethane. In this case, a grain side layer is formed on the artificial leather.

The composite fabric of the present invention, and the artificial leather produced from the composite fabric can be dyed or printed using a conventional method. Further, the artificial leather may be subjected to a crumpling process to make the artificial leather softer.

The composite fabric of the present invention also has an advantage in that the composite fabric is useful for producing a relatively thin artificial leather which is useful as a material for clothing, due to a high mechanical strength, softness and draping property. Also, the composite fabric of the present invention has a high compressibility and recovery from compression, because of incorporation of at least one non-woven fabric constituent which is bulky and has a high compressibility, and recovery from compression, into a woven or knitted fabric constituent.

In a conventional process, a thin non-woven fabric is produced by slicing a thick non-woven fabric into two or more pieces. However, the process of the present invention can produce a very thin composite fabric having a thickness of less than 1.0 mm, particularly, less than 0.5 mm, by forming a thin fibrous web directly on a thin woven or knitted fabric and, then, converting the fibrous web into a non-woven fabric while bonding the non-woven fabric to the woven or knitted fabric.

The composite fabric of the present invention has a smooth and even surface. Accordingly, the artificial leather obtained from the composite fabric of the present invention also has a smooth and even surface, which is able to be uniformly dyed or printed and converted into a uniform pile layer having a high density.

Also, it is important that the artificial leather obtained from the composite fabric of the present invention has a good chalk mark-forming property even when the piles in the pile layer have a relatively small length of 0.05 to 0.5 mm. This feature of the artificial leather is similar to that of natural nubuck leather.

The features and advantages of the present invention are further illustrated by the examples set forth hereinafter, which are not intended to limit the scope of the present invention in any way.

In the following examples and comparison examples, the properties of the composite fabric and the artificial leather were respectively determined in accordance with the following methods.

1. Tensile strength and breaking elongation.

Test specimens, each having a length of 20 cm and a width of 1 cm, were taken from the fabric to be tested. The full width of the end portions, of 5 cm lengths, of the specimen was gripped, and the specimen was stretched with an autograph until the specimen was broken. The maximum breaking load in kg/mm$^2$ and the elongation in % at break was measured.

2. Tear strength.

Test specimens, each having a length of 10 cm and a width of 2 cm, as indicated in FIG. 8A, were taken from the fabric to be tested. The specimen was cut from an end thereof to a point C in FIG. 9A. The end portions A and B, of 5 cm lengths, of the specimen were gripped and stretched with an autograph, in the manner as shown by arrows in FIG. 9B, until the specimen was broken. The maximum load in kg at break was measured.

3. Sewing strength.

Figure 10:
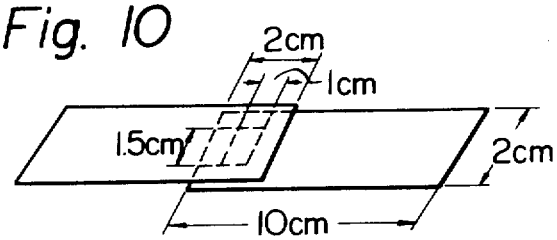
FIG. 10 is an explanatory view of a specimen of the composite fabric of the present invention for testing its sewing strength.

Test specimens, having a length of 10 cm and a width of 2 cm, were taken from the fabric to be tested. Two pieces of the specimens were overlapped and sewed together, in the manner indicated in FIG. 10, with a sewing machine, using a polyester sewing yarn of 50 metric count and a sewing needle of 11 number count, at a stitch number of 12 stitches/3 cm. The full width to the end portions, of 5 cm lengths, of the sewed specimens was gripped and stretched with an autograph until the sewed portion was broken. The maximum breaking load in kg/cm was measured.

4. Recovery on elongation.

Test specimens, 20 cm long and 1 cm wide, were taken from the fabric to be tested. A top end portion, of 5 cm length, of the specimen was gripped and fixed at its full width. The lower end portion, of 5 cm length, of the specimen was gripped and loaded with a weight of 1.0 kg. After the specimen was kept under the loaded condition for 10 minutes, the length of the specimen was measured. The specimen was released from the load and kept in the non-loaded condition for 10 minutes. After that, the length of the specimen was again measured. The recovery on elongation was determined in accordance with the following equality:

$$\text{Percent recovery} = [(L_1 - L_2)/(L_1 - L_0)] \times 100$$

wherein $L_0$ is the original length of the specimen before loading, $L_1$ is the length of the specimen after loading, and $L_2$ is the length of the specimen after releasing the load.

5. Compressibility and recovery on compression

Test specimens, 10 cm long and 10 cm wide, were taken from the fabric to be tested. Ten pieces of the specimens were superimposed and a thin metal plate having the same size as the specimen and a weight of 50 g was placed on the superimposed specimens. The total thickness ($t_0$) of the superimposed specimens was measured. A weight of 10 kg was placed on the metal plate in such a manner that the superimposed specimens were uniformly compressed. The specimens were kept in the compressed condition for 30 minutes. Thereafter, the total thickness ($t_1$) of the compressed superimposed specimens was measured. The weight was removed and the superimposed specimens were kept in the non-weighted condition for 30 minutes. Thereafter, the total thickness ($t_2$) of the superimposed specimens was again-measured.

The compressibility and the recovery on compression were determined in accordance with the following equalities.

$$\text{Compressibility}(\%) = [(t_0 - t_1)/t_0] \times 100$$

$$\text{Percent Recovery} = [(t_0 - t_2)/(t_0 - t_1)] \times 100$$

6. Density of fabric

In the determination of density of fabric, a MAEDA type of compressive elasticity tester was used. A test specimen, 6 cm wide and 7 cm long, was placed on a disc having a diameter of 2.0 cm, and a weight of 5.0 g was placed on the testing specimen at a load of 1.6 g/cm$^2$. Under this condition, the thickness of the specimen was measured. The volume in cm$^3$ of the specimen was calculated by using the thickness measured above, and the weight of g of the specimen was measured. The density of the specimen was determined in accordance with the following equality.

Density = (Weight/Volume)(g/cm$^3$)

7. Bonding strength

Figure 8:
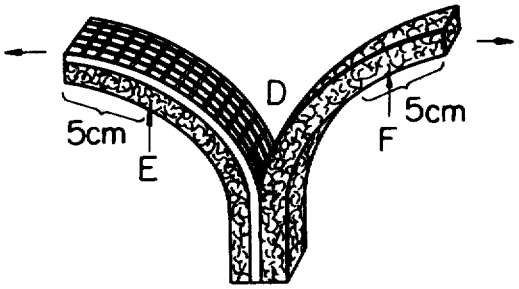
FIG. 8 is an explanatory view of a specimen of the composite fabric of the present invention for testing the bonding strength between the woven- or knitted fabric constituent and the non-woven fabric constituent.
Figure 9A:
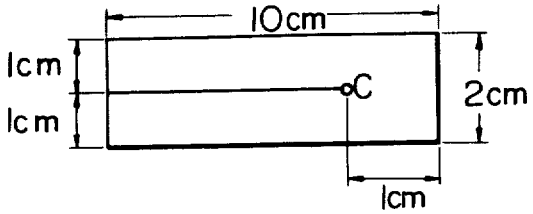
FIG. 9A is an explanatory view of a specimen of the composite fabric of the present invention, for testing the tear strength thereof.
Figure 9B:
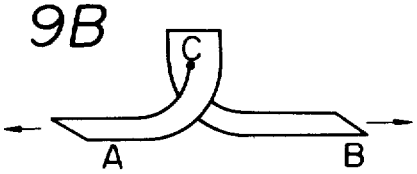
FIG. 9B is an explanatory view of a specimen of the composite fabric of the present invention in a posture for testing a tear strength thereof.

A test specimen, 20 cm long and 1 cm wide, was taken from the composite fabric to be tested. An end portion of the specimen was split from an end thereof to a point D 10 cm far from the end along the intersurface between a non-woven fabric constituent and a woven or knitted fabric constituent, in the manner as indicated in FIG. 8. The end portions E and F, of 5 cm lengths, of the specimen were gripped and stretched in opposite directions to each other with an autograph in the manner as indicated in FIG. 8, until the specimen was broken. The maximum load in g/cm was measured.

8. Resistance to abrasion

Test specimens, 200 mm long and 50 mm wide, were taken from the fabric to be tested. The specimens were set on a CASTOM type flat abrasion tester. The abrasion test was carried out by abrading the specimen 1,000 times with sand paper of a count of AA400, under a load of 456 g, at a rate of 125 cycles/minute. After completion of the abrasion test, the abrasion resistance of the specimen was evaluated in accordance with the following standard.

| Class | Remarks |
|---|---|
| 5 | No change |
| 4 | A minor portion of surface layer is broken |
| 3 | A major portion of surface layer is broken |
| 2 | The inside layer is broken |
| 1 | A hole is made |

9. Softness

Softness was measured in accordance with the method set forth in ASTM D 1388-64.

EXAMPLE 1

Polyethylene terephthalate chips were melted in an extruder and extruded at a temperature of 320° C. through 1500 spinning orifices each having a diameter of 0.30 mm, at a extruding rate of 0.15 g/minute per orifice, into a stream of steam blown in the same direction as the extruding direction, at a temperature of 365° C., under a pressure of 3.5 kg/cm$^2$. The resultant discontinuous and extremely fine fivers were randomly accumulated on a screen conveyer moving at a constant velocity along a path 40 cm far from the orifice ends. A random fibrous web having a weight of 80 g/cm$^2$ was obtained. Based on electron microscopic observation, the resultant fibers had an extremely small diameter of 1.5 microns, which corresponds to a denier of about 0.02, and substantially no melt-adhering of the fibers to each other was found.

A rough interlock knitted fabric made of polyethylene terephthalate multifilament yarn of 40 denier/36 filaments was uniformly opened and placed on the above-prepared random web. Another random web prepared as mentioned above was placed on the knitted fabric to provide a three layer precursory sheet. The precursory sheet was converted into a composite fabric by using the apparatus as shown in FIG. 6. That is, the precursory sheet was placed on the screen conveyer rotating around a pair of rollers at a velocity of 10 m/minute. Numerous water streams were ejected from the orifices toward a random web surface of the precursory sheet under the following conditions.

| | |
|---|---|
| Diameter of orifice hole | 0.10 mm |
| Number of orifices | 420 |
| Number of reciprocal movements of orifices | 200/minutes |
| Length of one movement of orifice | 3.0 cm |
| Jetting pressure of water | 25 kg/cm$^2$ |
| Forwarding velocity of precursory sheet | 1.0 m/minute |
| Width of precursory sheet | 30 cm |
| Impact area per jet | 0.071 mm$^2$ |
| Total impact area ratio | 5.0 |
| Distance between orifice and precursory sheet | 3.0 cm |

Simultaneously with jetting operation, a reduced pressure of 50 mmHg was applied to the opposite surface of the precursory sheet. The above-mentioned operations were applied to both the random web surfaces of the precursory sheet.

Next, both surfaces of the above-treated precursory sheet were impacted with numerous water jets under the following conditions, while a reduced pressure of 35 mmHg was applied to the surface opposite to the surface onto which the water jets were ejected.

| | |
|---|---|
| Diameter of orifice hole | 0.10 mm |
| Number or orifices | 420 |
| Number of reciprocal movements of orifices | 100/minute |
| Jetting pressure of water | 50 kg/cm$^2$ |
| Forwarding velocity of precursory sheet | 2.0 m/minute |
| Impact area per jet | 7.1 mm$^2$ |
| Distance between orifice and precursory sheet | 20 cm |

The ratio of the impact force of the water jet in the first jetting step to that in the second step was 1/50.

The resultant composite fabric had a cross-sectional structure as indicated in FIG. 3, and a high softness and resiliency. Both of the surfaces of the composite fabric contained no holes or dents and were very smooth and even.

The properties of the composite fabric are indicated below.

| | |
|---|---|
| Weight | 200 g/m$^2$ |
| Thickness | 0.78 mm |
| Density | 0.25 g/cm$^3$ |
| Tensile strength | 0.95 kg/mm$^2$ |
| Tear strength | 3.3 kg |
| Sewing strength | 6.7 kg/cm |
| Recovery on elongation | 83% |
| Compressibility | 32% |
| Recovery on compression | 81% |
| Softness | 26 mm |
| Bonding strength | 70 g/cm |
| Ratio of total weight of non-woven fabric constituents to knitted fabric constituent | |

The non-woven fabric constituents in the composite fabric had a density of 0.23 g/cm$^3$ and a tensile strength of 0.21 kg/mm$^2$.

The composite fabric was impregnated with a 5% aqueous solution of polyvinyl alcohol and dried. Thereafter, the composite fabric was impregnated with 40%, based on the weight of the composite fabric, of a 10% solution of polyurethane elastomer in dimethyl formamide. The impregnated composite fabric was immersed in a 30% aqueous solution of dimethyl formamide so as to completely coagulate the polyurethane elastomer in the composite fabric. Next, the composite fabric was immersed in hot water at a temperature of 70° C. so as to allow the composite fabric to shrink at an area shrinkage of 10%. The resultant artificial leather was washed, dried and, then, buffed on one surface thereof with sand paper. The resultant artificial leather had a nubuck-like pile layer consisting of extremely fine fibers and having a uniform and high density. The nubuck-like artificial leather had a high softness and resiliency. The pile layer surface was observed by using a microscope. The pile layer was composed of extremely fine non-bundled fibers having an average diameter of about 1.5 microns and a length of 50 to 500 microns. In spite of the extremely small length of the piles, the pile layer of the artificial leather had an excellent chalk mark-forming property and no polyurethane elastomer appeared on the pile layer surface.

The properties of the nubuck-like artificial leather are indicated below.

| | |
|---|---|
| Weight | 285 g/m$^2$ |
| Density | 0.32 g/cm$^3$ |
| Tensile strength | 1.03 kg/mm$^2$ |
| Tear strength | 3.5 kg |
| Sewing strength | 7.0 kg/cm |
| Recovery on elongation | 90% |
| Compressibility | 25% |
| Recovery on compression | 86% |
| Bonding strength | 230 g/cm |
| Softness | 32 mm |
| Resistance to abrasion | class 5 |

COMPARATIVE EXAMPLE 1

Island-in-sea type composite filaments were produced from 40% by weight of nylon 6 as an island component polymer and 60% by weight of polystyrene as a sea component polymer by means of a melt-spinning process. The composite filaments were crimped by using a stuffing box type crimping machine, and cut to form staple fibers having a length of 35 mm. The staple fibers were converted into a cross-laid web. The web was needle-punched at a needling density of 500 punches/cm$^2$ to form a non-woven fabric having a weight of 200 g/m$^2$. The non-woven fabric was treated with chloroform to eliminate the sea component polymer. The composite staple fibers were converted into fibrous bundles each composed of 100 individual extremely fine fibers, each having a denier of 0.1.

The resultant non-woven fabric had the following properties.

| | |
|---|---|
| Weight | 280 g/m$^2$ |
| Density | 0.13 g/cm$^3$ |
| Tensile strength | 0.38 kg/mm$^2$ |
| Tear strength | 1.5 kg |
| Sewing strength | 1.8 kg |
| Recovery on elongation | 40% |
| Compressibility | 52% |
| Recovery on compression | 54% |
| Softness | 38 mm |

The non-woven fabric was impregnated with the same polyurethane elastomer and by the same method as those described in Example 1. The resultant artificial leather was buffed to form a pile layer. The resultant buffed artificial leather had a poor resiliency and a paper-like appearance and feel. The pile layer was composed of fibrous bundles at a low density. Accordingly, the pile layer had a poor chalk mark-forming property and a rough surface. Further, the artificial leather had a touch and appearance similar to a low grade of suede leather.

COMPARATIVE EXAMPLE 2

A cross-laid web was produced by using a carding engine and a cross-layer from 9 parts by weight of polethylene terephthalate staple fibers, each having a denier of 0.5, which corresponds to a diameter of about 7 microns, and a shrinkage of 70%, and 1 part by weight of crimped polyethyelne terephthalate staple fibers having a denier of 1.5. The web was needle-punched at a punching density of 500 punches/cm$^2$, to produce a non-woven fabric having a weight of 200 g/m$^2$. The non-woven fabric was immersed in hot water of 80° C. so as to allow the fabric to shrink at an area shrinkage of about 50%. The shrunk non-woven fabric had the following properties.

| | |
|---|---|
| Weight | 280 g/cm$^2$ |
| Density | 0.15 g/cm$^3$ |
| Tensile strength | 0.42 kg/mm$^2$ |
| Tear strength | 1.8 kg |
| Sewing strength | 2.0 kg/cm |
| Recovery on elongation | 56% |
| Compressibility | 47% |
| Recovery on compression | 62% |
| Softness | 47 mm |

That is, the non-woven fabric had a poor density, resiliency, mechanical strength and softness.

The non-woven fabric was impregnated with the same polyurethane elastomer and in the same manner as those described in Example 1. The resultant artificial leather was buffed with sand paper. The resultant pile layer was composed of a mixture of polyethylene terephthalate fibers having deniers of 1.5 and 0.5, and had a low density, and an uneven and rough surface. The surface had a sandy feel. When the piles were cut into a length of 1 mm or less, the pile layer had a poor chalk mark-forming property and did not resemble the pile layer of a nubuck leather.

EXAMPLES 2 THROUGH 7 AND COMPARATIVE EXAMPLES 3

In each of Examples 2 through 5, a random web having a weight of 100 g/m$^2$ was produced from fibers having a diameter as indicated in Table 1. The fibers were produced by melting nylon 6 in an extruder and extruding the melt at a temperature of 320° C., at a extruding rate as indicated in Table 1, into a stream of steam, at a temperature of 360° C. ejected under a pressure of 4.0 kg/cm$^2$.

In each of Examples 6 and 7, nylon 6 was melted in an extruder, the melt was extruded at a temperature of 295° C., at a extruding rate as indicated in Table 2, and the extruded melt streams were solidified and wound up at a speed of 800 m/minute. The filaments prepared were drawn at a draw ratio of 2.7 to provide nylon 6 filaments each having a denier as indicated in Table 1.

In Comparative Example 3, the same procedures as those described in Examples 6 and 7 were carried out, except that the extruding rate and denier of the resultant drawn filaments were as indicated in Table 1.

In each of Examples 6 and 7 and Comparative Example 3, the drawn filaments were cut to form staple fibers 5 mm long. The staple fibers were suspended in water in an amount of 2000 times the weight of the staple fibers. A dispersing agent consisting of polyacrylamide was added in a concentration of 0.01% by weight to the suspension. The suspension was stirred so as to uniformly distribute the staple fibers in the water. The suspension was subjected to a paper-making process using a hydroformer type paper-making machine, to produce a random web having a weight of 100 g/m$^2$.

In each of Examples 2 through 7 and Comparative Example 3, a tricot fabric consisting of nylon 6 multifilament yarn, of 70 denier/36 filaments and having a weight of 60 g/m$^2$, was interposed between two pieces of the random webs obtained as described above to provide a three layer precursory sheet. The precursory sheet was converted into a composite fabric by using the same water-jetting process as that used in Example 1. The composite fabric was converted into a buffed artificial leather by using the same process as that employed in Example 1. The properties of the resultant artificial leathers of Examples 2 through 7 and Comparative Example 3 are indicated in Table 1.

TABLE 1

| | Extruding rate g/min per orifice | Average diameter of fiber (micron) | Property of artificial leather: Appearance (*) | Softness (mm) | Resistance to abrasion (class) | Synthetic estimation |
|---|---|---|---|---|---|---|
| Example No. | | | | | | |
| 2 | 0.10 | 0.1 | good nubuck-like | 26 | 3 | good |
| 3 | 0.12 | 0.5 | good nubuck-like | 26 | 4 | very good |
| 4 | 0.15 | 1 | very good high grade nubuck-like | 28 | 5 | excellent |
| 5 | 0.20 | 2 | very good high grade nubuck-like | 30 | 5 | excellent |
| 6 | 0.05 | 4 | good nubuck-like | 35 | 5 | very good |
| 7 | 0.07 | 6 | good nubuck-like | 38 | 5 | good |
| Comparative Example No. | | | | | | |
| 3 | 0.10 | 8 | bad not like nubuck | 49 | 5 | bad |

Note
(*)Appearance involves chalk mark-forming property and density of piles

Table 1 shows that the artificial leathers produced by using fibers having a diameter larger than 6 microns had a poor chalk mark-forming jproperty and a low density of piles. This type of artificial leather also had an undesirable sandy feel and, therefore, did not resemble natural nubuck leather. The fibers having a diameter of from 0.1 to 6.0 microns were useful for providing an artificial leather having a natural nubuck leather-like appearance and feel. Especially, the fibers of 1 to 2 micron diameter were useful for producing an artificial leather having a high grade of natural nubuck leather-like appearance and feel, and a very high softness and a high resistance to abrasion.

EXAMPLE 8

Polyethylene terephthalate chips were melted in an extruder and extruded at a temperature of 320° C., through 1500 spinning orifices, each having a diameter of 0.30 mm, at a extruding rate of 0.25 g/minute per orifice, into a stream of steam blown in the same direction as the extruding direction, at a temperature of 395° C. under a pressure of 2.5 kg/cm$^2$. The resultant extremely fine fibers were accumulated on a screen conveyer moving at a constant velocity and spaced 50 cm from the orifices. The resultant random fibrous web had a weight of 80 g/m$^2$ and consisted of numerous extremely fine fibers with an average diameter of 3 microns. A two layer precursory sheet was prepared by superimposing the above-prepared random web on a tricot fabric consisting nylon 6 multi-filament yarms of 150 denier/50 filaments and having a weight of 80 g/m$^2$. The precursory sheet was fed onto the screen conveyer of the water-jetting apparatus as indicated in FIG. 6 in such a manner that the random web surface of the precursory sheet faced the orifices. The water jetting operation was applied to the precursory sheet under the following conditions.

| | |
|---|---|
| Diameter of orifice hole | 0.20 mm |
| Number of orifices | 420 |
| Number of reciprocal movements of orifices | 150/minutes |
| Length of one movement of orifices | 3.0 cm |
| Jetting pressure of water | 50 kg/cm$^2$ |
| Forwarding velocity of precursory sheet | 2.0 m/minute |
| Width of precursory sheet | 30 cm |
| Impact area per jet | 0.50 mm$^2$ |
| Total impact area ratio | 13.4 |
| Distance between orifice and precursory sheet | 4 cm |

Simultaneously with the jetting operation, a reduced pressure of 150 mmHg was applied to the opposite surface of the precursory sheet. The above-mentioned operations were repeated two times. The resultant composite fabric had an internal structure as indicated in FIG. 4, and was highly soft and resilient.

The composite fabric had the following properties.

| | |
|---|---|
| Weight | 160 g/m$^2$ |
| Thickness | 0.50 mm |
| Density | 0.32 g/cm$^3$ |
| Tensile strength | 1.4 kg/mm$^2$ |
| Tear strength | 4.2 kg |
| Sewing strength | 6.8 kg/cm |
| Recovery on elongation | 82% |
| Compressibility | 28% |
| Recovery on compression | 78% |

-continued

| | |
|---|---|
| Softness | 31 mm |
| Bonding strength | 220 g/cm |
| Ratio of weight of non-woven fabric constituent to tricot fabric constituent | 1.0 |

The non-woven fabric constituent in the composite fabric had a density of 0.26 g/cm$^3$ and a tensile strength of 0.30 kg/mm$^2$.

The composite fabric was impregnated with 70%, based on the weight of the composite fabric, of the same polyurethane elastomer and by the same method as those used in Example 1. The impregnated fabric was shrunk in boiling water at an area shrinkage of 7% and, then, buffed with sand paper, to provide a nubuck-like artificial leather.

The pile layer formed on the artificial leather surface was composed of extremely fine piles with a length of 200 microns and had an even appearance. The pile layer also had a high density and a good chalk mark-forming property.

The resultant nubuck-like artificial leather had the following properties.

| | |
|---|---|
| Weight | 180 g/cm$^2$ |
| Thickness | 0.4 mm |
| Density | 0.45 g/cm$^3$ |
| Tensile strength | 1.6 kg/mm$^2$ |
| Tear strength | 4.4 kg |
| Sewing strength | 7.2 kg/cm |
| Recovery on elongation | 86% |
| Compressibility | 24% |
| Recovery on compression | 84% |
| Softness | 42 mm |
| Bonding strength | 360 g/cm |
| Resistance to abrasion | class 5 |

| | |
|---|---|
| Diameter of orifice hole | 0.15 mm |
| Number of orifices | 420 |
| Number of reciprocal movements of orifices | 200/minutes |
| Length of one movement of orifice | 3.0 cm |
| Jetting pressure | 40 kg/cm$^2$ |
| Forwarding velocity of precursory sheet | 1.7 m/minute |
| Width of precursory sheet | 30 cm |
| Impact area per jet | 0.20 mm$^2$ |
| Total impact area ratio | 9.9 |
| Distance between orifice and precursory sheet | 3.5 cm |

A reduced pressure of 70 mmHg was applied onto the opposite surface of the precursory sheet during the water-jetting operation.

The above-mentioned operations were carried out twice on each of the web surfaces of the precursory sheet.

Next, the above-treated sheet was subjected to a second water-jetting process by using an apparatus as shown in FIG. 6 under the following conditions.

| | |
|---|---|
| Diameter of orifice | 0.10 mm |
| Number of orifices | 400 |
| Number of reciprocal movements of orifices | 120/minute |
| Jetting pressure | 100 kg/cm$^2$ |
| Forwarding velocity of sheet | 1.5 m/minute |
| Impact area per jet | 3.6 mm$^2$ |
| Distance of orifice to sheet | 1.8 cm |
| Ratio of impact force of water jet in second step to that in first step | 1/16 |

The resultant composite fabric was highly soft smooth and resilient and had the properties as shown in Table 2.

TABLE 2

| Example No. | | 9A | 9B | 9C | 9D |
|---|---|---|---|---|---|
| Woven or knitted fabric | Type Weight (g/m$^2$) | Knitted[1] lace fabric 20 | Woven[2] gauze 30 | Double[3] knitted fabric 80 | Tricot[4] fabric 100 |
| Composite fabric | Weight (g/m$^2$) | 180 | 190 | 240 | 260 |
| | Thickness (mm) | 0.75 | 0.68 | 0.80 | 0.95 |
| | Density (g/cm$^3$) | 0.24 | 0.28 | 0.30 | 0.27 |
| | Tensile strength (kg/mm$^2$) | 0.6 | 0.8 | 1.2 | 1.5 |
| | Tear strength (kg) | 6.4 | 7.6 | 8.8 | 10.5 |
| | Sewing strength (kg/cm) | 6.6 | 7.5 | 11.5 | 12.4 |
| | Softness (mm) | 26 | 30 | 33 | 38 |
| | Recovery on elongation (%) | 81 | 87 | 90 | 93 |
| | Compressibility (%) | 32 | 38 | 42 | 46 |
| | Recovery on compression (%) | 80 | 86 | 92 | 84 |
| | Bonding strength (g/cm) | 160 | 85 | 55 | 35 |

Note

[1]Knitted lace fabric consisted of polyethylene terephthalate multifilament yarns of 20 denier/15 filaments.

[2]Woven gauze was composed of viscose rayon multifilament yarns of 40 denier/30 filaments.

[3]Double knitted fabric was composed of nylon 66 multifilament yarns of 70 denier/24 filaments.

[4]Tricot fabric was composed of nylon 66 multifilaments yarns of 50 denier/10 filaments.

EXAMPLES 9A THROUGH 9D

In each of Examples 9A through 9D, two pieces of the same random webs as that used in Example 1 were prepared. A type of woven or knitted fabric as indicated in Table 2 was interposed between two pieces of the random webs to prepare a three layer precursory sheet. The precursory sheet was subjected to a first water jetting process by using an apparatus as indicated in FIG. 6 under the following conditions.

The composite fabric of Example 9B was impregnated with 50%, based on the weight of the composite fabric, of styrene-butadiene rubber by using a styrene-butadiene rubber latex. The impregnated fabric was immersed in boiling water so as to allow the fabric to shrink at an area shrinkage of 20%. The resultant artificial leather was buffed with sand paper. The resultant nubuck-like pile layer was composed of extremely fine piles having an average length of 800 micron, and had a high density and a good chalk mark-forming property. The nubuck-like artificial leather had a weight of 290 g/m$^2$ and a density of 0.35 g/cm$^3$.

EXAMPLE 10

Nylon 66 chips were melted in an extruder and extruded at a temperature of 355° C., at an extruding rate of 0.15 g/minute per orifice, into an air stream blown at a temperature of 410° C. under a pressure of 3.5 kg/cm$^2$. The resultant extremely fine fibers, having an average diameter of 3 microns were accumulated on a net moving at a constant velocity and spaced 30 cm from the orifice. A random web having a weight of 40 g/m$^2$ was obtained.

The same procedures as those mentioned above were carried out, except that the velocity of movement of the net was one third of that in the above-mentioned procedures. A random web having a weight of 120 g/m$^2$ was obtained.

A plain woven fabric consisting of polyethylene terephthalate multifilament yarns, of 40 denier/200 filaments, and having a weight of 60 g/m$^2$, was interposed between the 40 g/m$^3$ random web and the 120 g/m$^3$ random web prepared as described above. The resulting three layer precursory sheet was subjected to a water jetting process by using an apparatus as shown in FIG. 6.

The water jetting operation was carried out under conditions detailed below, while a reduced pressure of 200 mmHg was applied onto the lower surface of the precursory sheet.

| | |
|---|---|
| Diameter of orifice | 0.06 mm |
| Number of orifices | 420 |
| Number of reciprocal movement of orifices | 200/minute |
| Length of one movement of orifices | 3.0 cm |
| Jetting pressure | 60 kg/cm$^2$ |
| Forwarding velocity of sheet | 1.0 m/minute |
| Width of sheet | 30 cm |
| Impact area per jet | 0.032 mm$^2$ |
| Total impact area ratio | 3.4 |
| Distance between orifice and sheet surface | 3.5 cm |

The above-mentioned operations were applied to both the upper and lower surfaces of the procursory sheet.

The resultant composite fabric had the following properties.

| | |
|---|---|
| Weight | 200 g/m$^3$ |
| Thickness | 1.1 mm |
| Density | 0.18 g/cm$^3$ |
| Tensile strength | 0.87 kg/mm$^2$ |
| Tear strength | 3.1 kg |
| Sewing strength | 6.4 kg/cm |
| Compressibility | 34% |
| Recovery on compression | 78% |
| Recovery on elongation | 80% |
| Softness | 28 mm |
| Bonding properties | 60 g/cm |
| Ratio of total weight of non-woven fabric constituent to woven or knitted fabric constituent | 2.7 |

The non-woven fabric constituent had a density of 0.18 g/cm$^3$ and a tensile strength of 0.23 kg/mm$^2$. The composite fabric was impregnated with 20%, based on the weight of the composite fabric, of the same polyurethane elastoner and by the same method as those used in Example 1, immersed in boiling water so as to shrink it at an area shrinkage of 12%, and then, buffed with sand paper. The resultant nubuck-like artificial leather had a smooth and even pile layer consisting of extremely fine piles having an average length of 1 mm. The pile layer had a high density and a good chalk mark-forming property. The artifical leather was of a weight of 210 g/m$^2$ and a density of 0.25 g/cm$^3$.

EXAMPLE 11

A random web having a weight of 150 g/m$^2$ and composed of extremely fine polyethylene terephthalate fibers, having an average diameter of 1.5 microns, was prepared by the same method as used in Example 1, except that the extremely fine fibers were blown toward a woven fabric placed on the net moving at a constant velocity. The woven fabric was composed of nylon 66 multifilament yarns of 120 deniers/86 filaments and had a weight of 80 g/m$^2$. The distance between the orifice and the net was 40 cm.

The resultant two layer precursory sheet was subjected to a water-jetting process by using an apparatus as shown in FIG. 6 under the conditions indicated below, while a reduced pressure of 40 mmHg was applied to the lower surface of the precursory sheet.

| | |
|---|---|
| Diameter of orifice | 0.10 mm |
| Number of orifices | 360 |
| Number of reciprocal movements of orifices | 50/minutes |
| Length of one movement of orifices | 3.0 cm |
| Jetting pressure | 30 kg/cm$^2$ |
| Forwarding velocity of sheet | 2.0 m/minute |
| width of sheet | 30 cm |
| Impact area per jet | 0.071 mm$^2$ |
| Total impact area ratio | 1.6 |
| Distance between orifice and sheet | 3.0 cm |

The above-mentioned operations were repeated three times to convert the precursory sheet into a composite fabric.

The resultant composite fabric was highly soft and resilient and had the following properties.

| | |
|---|---|
| Weight | 220 g/m$^2$ |
| Thickness | 1.5 mm |
| Density | 0.15 g/cm$^3$ |
| Tensile strength | 1.1 kg/mm$^2$ |
| Tear strength | 2.9 kg |
| Sewing strength | 6.0 kg/cm |
| Recovery on elongation | 78% |
| Compressibility | 33% |
| Recovery on compression | 75% |
| Softness | 26 mm |
| Bonding strength | 30 g/cm |
| Ratio in weight of non-woven fabric constituent to woven fabric | 1.9 |

The non-woven fabric constituent had a density of 0.12 g/cm$^3$ and a tensile strength of 0.27 kg/mm$^2$.

The resultant composite fabric was impregnated with 40%, based on the weight of the composite fabric, of the same polyurethane elastomer and by the same method as those used in Example 1, and then, the surface of the non-woven fabric constituent was buffed with sand paper.

The resultant nubuck-like artificial leather had a uniform and dense pile layer consisting of extremely fine piles. The artificial leather also had the following properties.

| | |
|---|---|
| Weight | 320 g/m$^2$ |
| Density | 0.25 g/cm$^3$ |
| Tensile strength | 1.3 kg/mm$^2$ |
| Tear strength | 3.2 kg |

-continued

| | |
|---|---|
| Sewing strength | 6.5 kg/cm |
| Recovery on elongation | 86% |
| Compressibility | 31% |
| Recovery on compression | 81% |
| Softness | 33 nm |
| Resistance to abrasion | class 5 |
| Bonding strength | 210 g/cm |

EXAMPLE 12

Viscose rayon yarns, each consisting of 50 individual filaments, each having a diameter of 5 microns, were cut to provide staple fibers having a length of 3 mm. 650 g of the staple fibers were suspended in 500 liters of water containing 0.0002% by weight of a dispersing agent consisting of polyacrylamide, to provide an aqueous suspension containing 0.13% by weight of the staple fibers.

Two pieces of random webs, having a weight of 80 g/m$^2$, were prepared from the aqueous suspension by using a hydroformer type paper-making machine.

A twill woven fabric, which was composed of cuprammonium rayon multifilaments yarns of 40 deniers/46 filaments and had a weight of 80 g/m$^2$, was interposed between the two pieces of the random webs, prepared as mentioned above, to provide a three layer precursory sheet.

The same water-jetting process as that used in Example 1 was applied to each random web surface of the precursory sheet while a reduced pressure of 10 mmHg was applied to the opposite surface of the precursory sheet.

The resultant composite fabric had a density of 0.30 g/cm$^3$, a softness of 36 mm, a bonding strength more than 250 g/cm and a ratio of the total weight of the non-woven fabric constituents to the weight of the woven fabric constituent of 2.0.

The composite fabric could be converted, by the same process as described in Example 1, into a nubuck-like artificial leather having a smooth and dense pile layer.

COMPARATIVE EXAMPLE 4

A random web having weight of 200 g/m$^2$ and consisting of polyethylene terephthalate fibers with an average diameter of 2.0 microns was produced by using the same melt-blow process as that utilized in Example 1, except that the extruding rate was 0.2 g/minute per orifice, the temperature of the steam stream was 385° C. and the blowing pressure of the steam was 4.0 kg/cm$^2$. The web had an area shrinkage of 40% in boiling water. The random web was subjected to the same water-jetting process as that used in Example 1, while a reduced pressure of 35 mmMg was applied to the lower surface of the random web.

The resultant non-woven fabric was very soft and resilient and had the following properties.

| | |
|---|---|
| Density | 0.20 g/cm$^3$ |
| Tensile strength | 0.19 kg/mm$^2$ |
| Tear strength | 1.1 kg |
| Sewing strength | 1.3 kg/cm |

That is, the non-woven fabric had a poor tensile strength. The non-woven fabric was impregnated with 40%, based on the weight of the fabric, of the same polyurethane elastomer and by the same method as described in Example 1, and then immersed in boiling water to shrink to an area shrinkage of 15%. Thereafter, the resultant artificial leather was washed, dried and then raised with sand paper to form a pile layer. The artificial leather had the following properties.

| | |
|---|---|
| Weight | 280 g/m$^2$ |
| Tensile strength | 0.25 kg/mm |
| Tear strength | 1.5 kg |
| Sewing strength | 1.7 kg/cm |

In spite of its beautiful appearance and feel, the artificial leather had poor tensile strength, tear strength and sewing strength.

COMPARATIVE EXAMPLE 5

Polyethylene terephthalate filaments having a denier of 2 which correspond to a diameter of about 15 microns, were cut to provide staple fibers having a length of 3.0 cm. Two pieces of webs having weight of 80 g/cm$^2$ were produced from the staple fibers by using a carding engine. A cotton gauze fabric having a weight of 40 g/m$^2$ was interposed between two pieces of the web. The resultant three-layer precursory sheet was converted into a composite fabric by using the same process as described in Example 1. The resulting composite fabric had a density of 0.18 g/cm$^3$ and a softness of 62 mm.

The composite fabric was impregnated with 40%, based on the weight of the composite fabric, of the same polyurethane elastomer by using the same process as described in Example 1, and then raised with sand paper.

The pile layers of the resultant raised fabric is composed of 2 denier piles and, therefore, had a sandy feel and a rough appearance. Even when the pile layer was sheared to provide piles 1 to 2 mm long, the pile layer could not exhibit a chalk mark-forming effect. The resultant fabric had the following properties.

| | |
|---|---|
| Weight | 280 g/m$^2$ |
| Density | 0.24 g/cm$^3$ |
| Tensile strength | 0.83 kg/mm$^2$ |
| Tear strength | 3.1 kg |
| Sewing strength | 6.7 kg/cm |
| Softness | 68 mm |

The resultant fabric could not be utilized as an artificial leather.

COMPARATIVE EXAMPLE 6

The same three-layer precursory sheet as that obtained in Example 1 was needle-punched at a needling density of 500 punches/cm$^2$. During the needle-punching operation, a large amount of the extremely fine fibers are removed from the precursory sheet. After completion of the needle-punching process, numerous holes and dents were found in the resultant composite fabric. Also, a portion of the knitted fabric constituent appeared on the surface of the composite fabric.

The composite fabric had the following properties.

| | |
|---|---|
| Weight | 160 g/m$^2$ |
| Thickness | 0.94 mm |
| Density | 0.17 g/cm$^3$ |
| Tensile strength | 0.35 kg/mm$^2$ |
| Tear strength | 1.6 kg |

-continued

| | |
|---|---|
| Sewing strength | 4.2 kg/cm |
| Recovery on elongation | 68% |
| Compressibility | 50% |
| Recovery on compression | 62% |
| Bonding strength | 20 g/cm |

The non-woven fabric constituent had a density of 0.12 g/cm$^3$ and a tensile strength of 0.05 kg/mm$^2$.

From the fact that the above shown tensile strength of the non-woven fabric constituent is very poor, it is obvious that the extremely fine fibers in the non-woven fabric constituent are entangled at a very poor degree of a three-dimensional entanglement. Also, from the low tensile strength of the composite fabric, it is evident that a considerable amount of fibers in the knitted fabric constituent are broken by needles during the needle-punching process.

The composite fabric was impregnated with a polyurethane elastomer by the same method as that mentioned in Example 1 and then raised.

The resultant sheet had a paper-like appearance and feel and a poor resiliency due to the low degree of the three-dimensional entanglement of the fibers in the non-woven fabric constituents. Furthermore, the resultant pile layer had a low density of piles and an uneven appearance and feel, because the pile layer was contaminated with thick piles derived from the fibers of the knitted fabric constituent and because the surface of the non-woven fabric constituent was unevenly buffed due to the existance of holes and dents formed by the needle-punching process. The resultant sheet could not be utilized as an artificial leather and had the following properties.

| | |
|---|---|
| Weight | 210 g/m$^2$ |
| Density | 0.20 g/cm$^3$ |
| Tensile strength | 0.48 kg/mm$^2$ |
| Tear strength | 1.9 kg |
| Sewing strength | 4.6 kg/cm |
| Recovery on elongation | 72% |
| Compressibility | 45% |
| Recovery on compression | 67% |

COMPARATIVE EXAMPLES 7, 8 AND 9

A random web having a weight of 150 g/m$^2$ was produced from polyethylene terephthalate chips by using the same melt-blow process as used in Example 1. A woven fabric consisting of nylon 66 multifilament yarns of 120 denier/86 filaments and having a weight of 80 g/m$^2$ was fed onto a net spaced 15 cm (Comparative Example 7), 20 cm (Comparative Example 8), and 40 cm (Comparative Example 9) from the orifices and moving at a constant velocity. The extremely fine fibers having an average diameter of 1.5 microns were blown onto the woven fabric so as to form a two-layer precursory sheet.

In the precursory sheet of Comparative Example 7, the resultant extremely fine fibers melt-adhered to each other and to the fibers in the woven fabric constituent. The precursory sheet of Comparative Example 7 failed to be converted into a composite fabric by the same water-jetting process as that used in Example 1.

In comparative Example 8, the melt-blown extremely fine fibers melt-adhered to each other and to the fibers in the woven fabric constituent, and the resultant precursory sheet was impregnated with 40%, based on the weight of the composite fabric, of the same polyurethane elastomer by using the same process as those described in Example 1, and buffed with sand paper, without applying the water-jetting process to the precursory sheet.

The resultant sheet had the following properties.

| | |
|---|---|
| Weight | 320 g/m$^2$ |
| Density | 0.19 g/cm$^3$ |
| Tensile strength | 0.72 kg/mm$^2$ |
| Tear strength | 2.4 kg |
| Sewing strength | 5.2 kg/cm |
| Recovery on elongation | 65% |
| Compressibility | 8% |
| Recovery on compression | 43% |
| Softness | 63 mm |
| Resistance to abrasion | class 2 |
| Bonding strength | 100 g/cm |

The sheet of Comparative Example 8 had a paper-like appearance, a stiff feel and a low resiliency. Since the pile layer had a low and uneven density of piles, this sheet, therefore, could not be utilized as an artificial leather.

In the precursory sheet of Comparative Example 9, no melt-adhering of the extremely fine fibers to each other and to the fibers in the woven fabric constituent was observed. However, the precursory sheet had a very poor bonding strength of 15 g/cm; therefore, the woven fabric constituent could be easily separated from the non-woven fabric constituent.

The precursory sheet was impregnated with 40%, based on the weight of the sheet, of the same polyurethane elastomer by using the same process as those described in Example 1, and buffed with sand paper without using the water-jetting process for the precursory sheet.

The resultant sheet had a paper-like appearance and feel and the following properties.

| | |
|---|---|
| Weight | 320 g/m$^2$ |
| Density | 0.17 g/cm$^3$ |
| Tensile strength | 0.67 kg/mm$^2$ |
| Tear strength | 2.2 kg |
| Sewing strength | 5.1 kg/cm |
| Recovery on elongation | 67% |
| Compressibility | 11% |
| Recovery on compression | 45% |
| Softness | 38 mm |
| Resistance to abrasion | class 2 |
| Bonding strength | 70 g/cm |

The bonding strength of the sheet was extremely poor because a number of air bubbles were formed on the intersurface between the woven fabric constituent and the web constituent. Also, the sheet had an appearance and feel similar to those of paper and low resiliency. The pile layer of the sheet was extremely rough and uneven; therefore, the sheet could not be used as an artificial leather.

What is claimed is:

1. A composite fabric usable as a substratum sheet for artificial leather and comprising a woven or knitted fabric constituent and at least one non-woven fabric constituent in an amount of 100% or more based on the weight of said woven or knitted fabric constituent, said non-woven fabric constituent having a smooth and even outer surface and consisting of numerous extremely fine individual fibers which have an average diameter of 0.1 to 6.0 microns and are randomly distributed and three-dimensionally entangled with each other to form a body of non-woven fabric, said non-woven fabric constituent and said woven or knitted fabric constituent being superimposed and bonded together, to form a body of composite fabric in such a manner that a portion of said extremely fine individual fibers in said non-woven fabric constituent penetrate into the inside of said woven or knitted fabric constituent and are entangled with a portion of fibers in said woven or knitted fabric constituent, and the bonding strength between said woven or knitted fabric constituent and said non-woven fabric constituent being at least 30 g/cm.

2. A composite fabric as claimed in claim 1, wherein said woven or knitted fabric constituent is interposed between two non-woven fabric constituents.

3. A composite fabric as claimed in claim 1, wherein one non-woven fabric constituent is superimposed on one woven or knitted fabric constituent.

4. A composite fabric as claimed in claim 1, wherein said extremely fine individual fibers in said non-woven fabric constituent are produced from a synthetic polymer by using a melt blow process and are substantially free from melt-bonding to each other.

5. A composite fabric as claimed in claim 1, wherein said extremely fine individual fibers in said non-woven fabric constituent are three-dimensionally entangled with each other, and penetrate and three-dimensionally entangle with a portion of the fibers in said woven or knitted fabric constituent by using the action of numerous liquid jets ejected under a high pressure toward said non-woven fabric constituent placed on said woven or knitted fabric constituent.

6. A composite fabric as claimed in claim 1, wherein said extremely fine individual fibers consist of a polyester or a polyamide.

7. A composite fabric as claimed in claim 1, wherein said non-woven fabric constituted had a density of from 0.10 to 0.30 g/cm$^3$ and a tensile strength of from 0.10 to 0.30 kg/mm$^2$.

8. A composite fabric as claimed in claim 1, wherein the total weight of said at least one non-woven fabric constituent is in a range from 80 to 300 g/m$^2$.

9. A composite fabric as claimed in claim 1, wherein said woven or knitted fabric constituent has a weight of from 20 to 80 g/m$^2$.

10. A composite fabric as claimed in claim 1, wherein the total weight of said at least one non-woven fabric constituent is in a range of from 200 to 800% based on the weight of said woven or knitted fabric constituent.

11. A composite fabric as claimed in claim 1, wherein said bonding strength between said woven or knitted fabric constituent and said non-woven fabric constituent is in a range of from 50 to 250 g/cm.

12. A composite fabric as claimed in claim 1, wherein said composite fabric has an average density of from 0.15 to 0.32 g/cm$^3$ and a tensile strength of from 0.5 to 1.8 kg/mm$^2$.

13. A composite fabric as claimed in claim 1, wherein numerous piles consisting of said extremely fine individual fibers are formed on the surface of said non-woven fabric constituent.

14. A composite fabric as claimed in claim 1, wherein said composite fabric is impregnated with a rubber-like elastic polymer and the non-woven fabric constituent surface of said impregnated composite fabric is raised.

15. A composite fabric as claimed in claim 14, wherein said elastic polymer is polyurethane.

16. A composite fabric as claimed in claim 14, wherein said elastic polymer is present in an amount of from 20 to 70%, based on the total weight of said composite fabric.

17. A composite fabric as claimed in claim 13, wherein said extremely fine piles have an average length of from 0.05 to 1.0 mm.

18. A composite fabric as claimed in claim 1, wherein said composite fabric has an area shrinkage of from 5 to 20% in boiling water.

19. A process for producing a composite fabric usable as a substratum sheet for artificial leather, comprising:

forming a fibrous web constituent by randomly massing numerous extremely fine individual fibers having an average diameter of from 0.1 to 6.0 microns;

forming a multilayer precursory sheet by superimposing a woven or knitted fabric constituent and at least one said fibrous web constituent on each other, jetting numerous fluid streams ejected under a pressure of from 15 to 100 kg/cm$^2$ toward the surface of said fibrous web constituent of said percursory sheet, at a ratio of a total impact area of said fluid jets on said percursory sheet surface to an area of said precursory sheet surface to be impacted of at least 1.5, to convert said fibrous web into a non-woven fabric constituent in which said extremely fine individual fibers are randomly entangled with each other and to convert said precursory sheet into a composite fabric in which said non-woven fabric constituent is bonded to said woven or knitted fabric constituent in such a manner that a portion of said extremely fine individual fibers penetrate from said non-woven fabric constituent into the inside of said woven or knitted fabric constituent and are entangled with a portion of the fibers within said woven or knitted fabric constituent, and;

at the same time as said fluid stream jetting operation, applying a reduced pressure of 10 to 200 mmHg onto a surface of said precursory sheet opposite to said fibrous web surface.

20. A process as claimed in claim 19, wherein said fluid stream jetting operation is carried out in at least two successive steps in such a manner that each fluid stream jet in a preceding jetting step impacts against said precursory sheet in an impact area smaller than that in a succeeding step and the impacting force of each fluid stream jet in a preceding jetting step is at least ten times that in a succeeding step, in order to eliminate holes and densts formed on said precursory sheet surface by the action of said fluid stream jets in the preceding step.

*21. An extremely fine fiber fabric usable as a substratum sheet for an artificial leather, comprising at least one non-woven fabric constituent having a smooth and even outer surface and consisting of numerous extremely fine individual fibers which have an average diameter of 0.1 to 6.0 microns and are randomly distributed and three-dimensionally entangled with each other to form a body of non-woven fabric.*

*22. A fabric as claimed in claim 21, wherein said extremely fine individual fibers in said non-woven fabric constituent are produced from a synthetic polymer by using a melt blow process and are substantially free from melt-bonding to each other.*

*23. A fabric as claimed in claim 21, wherein the three-dimensional entanglement of said extremely fine individ-*

*ual fibers is formed by using the action of numerous liquid jets ejected under a high pressure toward said non-woven fabric constituent.*

*24. A fabric as claimed in claim 21, wherein said extremely fine individual fibers consist of a polyester or a polyamide.*

*25. A fabric as claimed in claim 21, wherein said non-woven fabric constituent had a density of from 0.10 to 0.30 g/cm*$^3$ and a tensile strength of from 0.10 to 0.30 kg/mm$^2$.

*26. A fabric as claimed in claim 21, wherein the total weight of said at least one non-woven fabric constituent is in a range from 80 to 300 g/m*$^2$.

*27. A fabric as claimed in claim 21, wherein numerous piles consisting of said extremely fine individual fibers are formed on the surface of said non-woven fabric constituent.*

*28. A fabric as claimed in claim 21, wherein said fabric is impregnated with a rubber-like elastic polymer and the surface of said impregnated fabric is raised.*

*29. A fabric as claimed in claim 28, wherein said elastic polymer is polyurethane.*

*30. A fabric as claimed in claim 28, wherein said elastic polymer is present in an amount of from 20 to 70%, based on the weight of said fabric.*

*31. A fabric as claimed in claim 27, wherein said extremely fine piles have an average length of from 0.05 to 1.00 mm.*

* * * * *